April 18, 1939.  W. E. SPARLING ET AL  2,155,173
SYSTEM OF AND APPARATUS FOR HANDLING BARRELS AND
DISCHARGING THE CONTENTS THEREOF
Filed Dec. 20, 1935   5 Sheets-Sheet 4
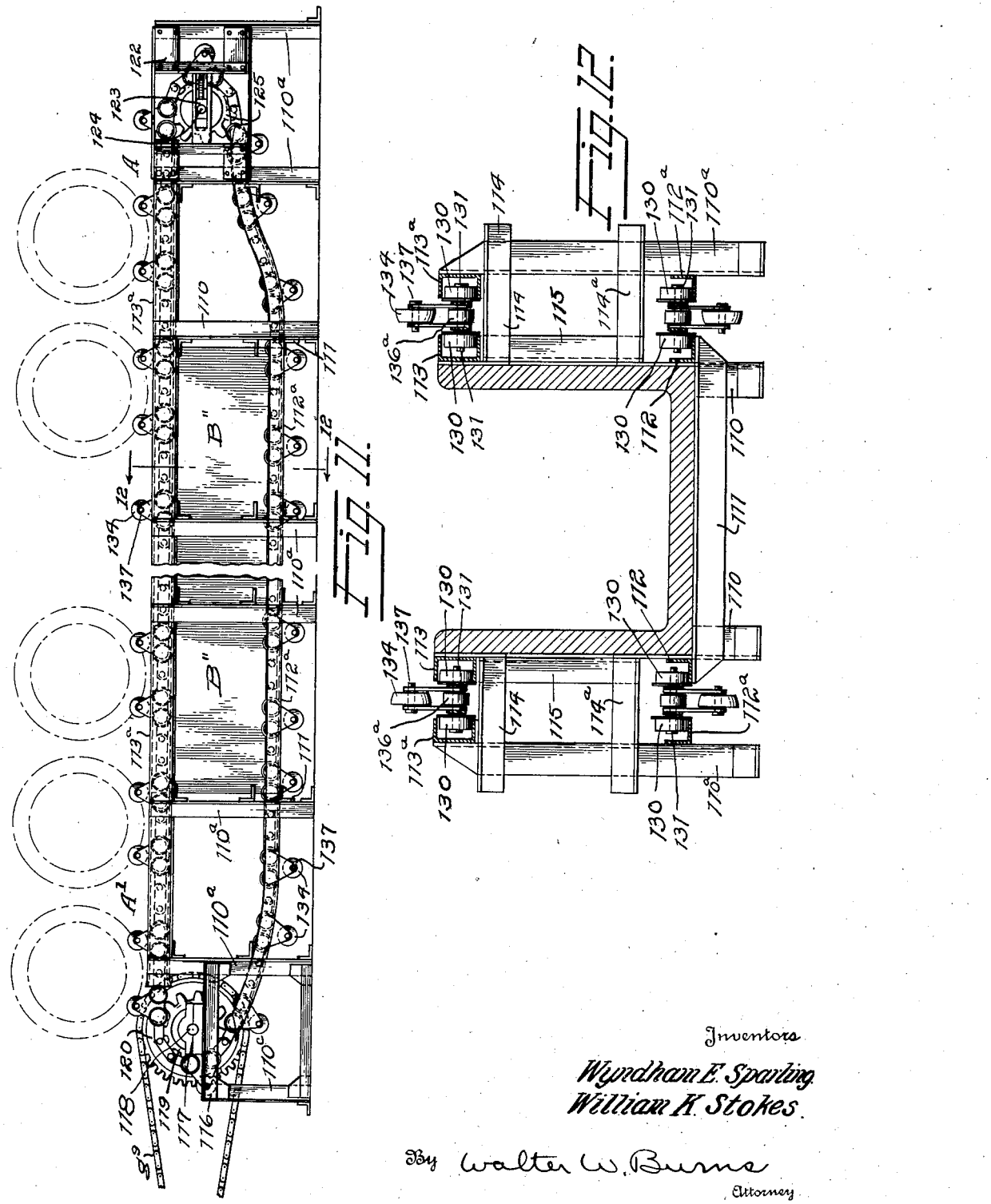
Inventors
Wyndham E. Sparling
William K. Stokes
By Walter W. Burns
Attorney

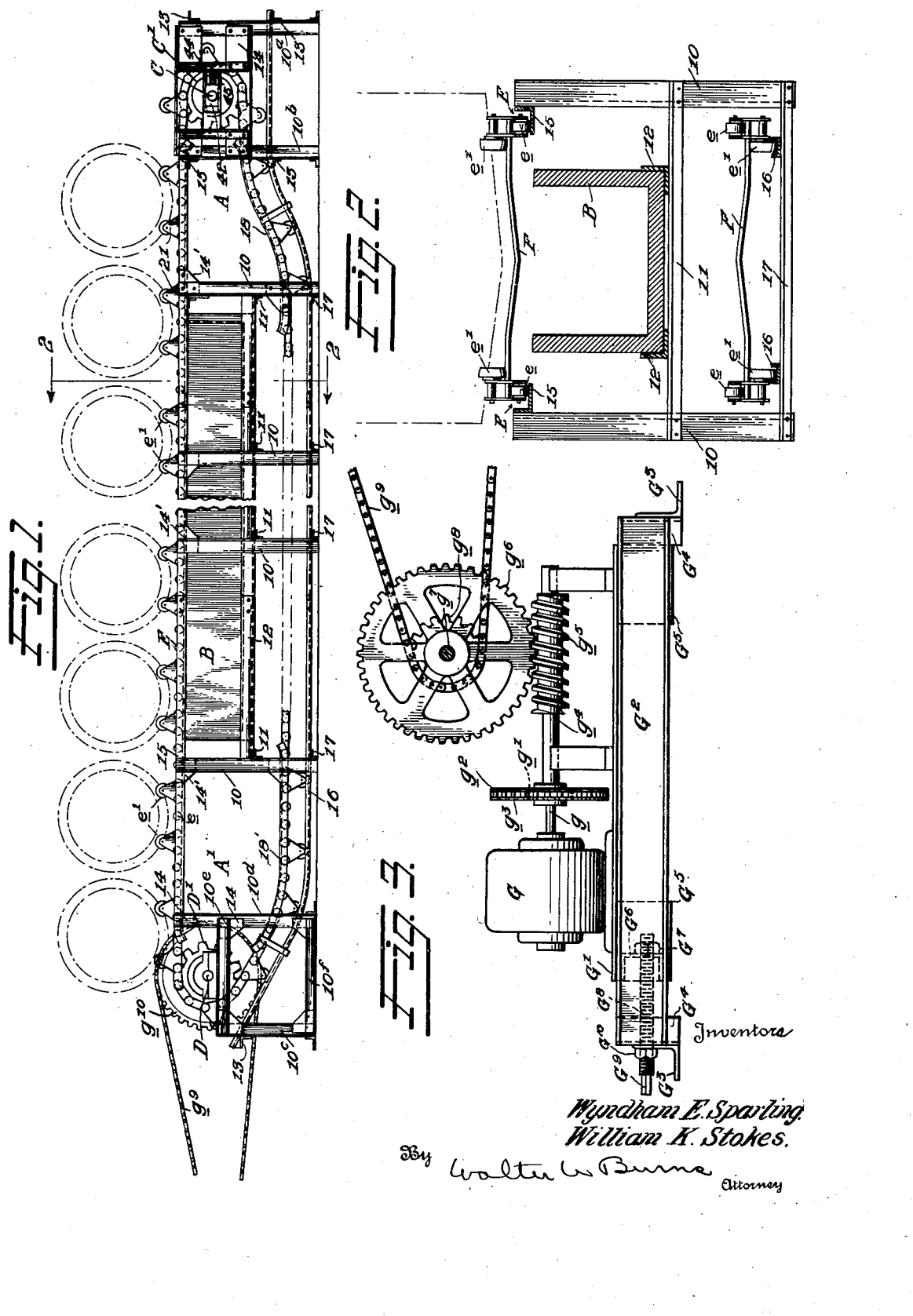

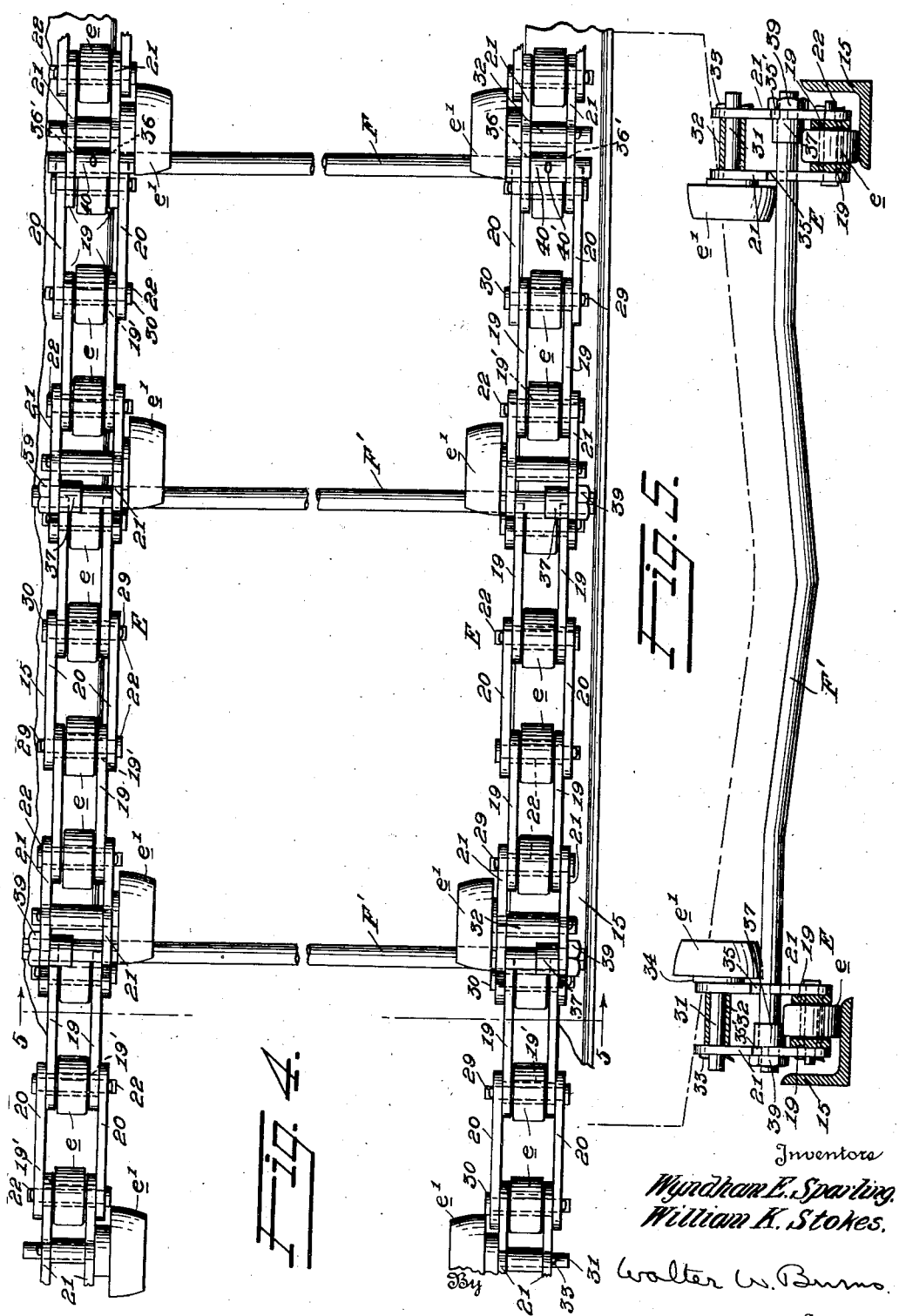

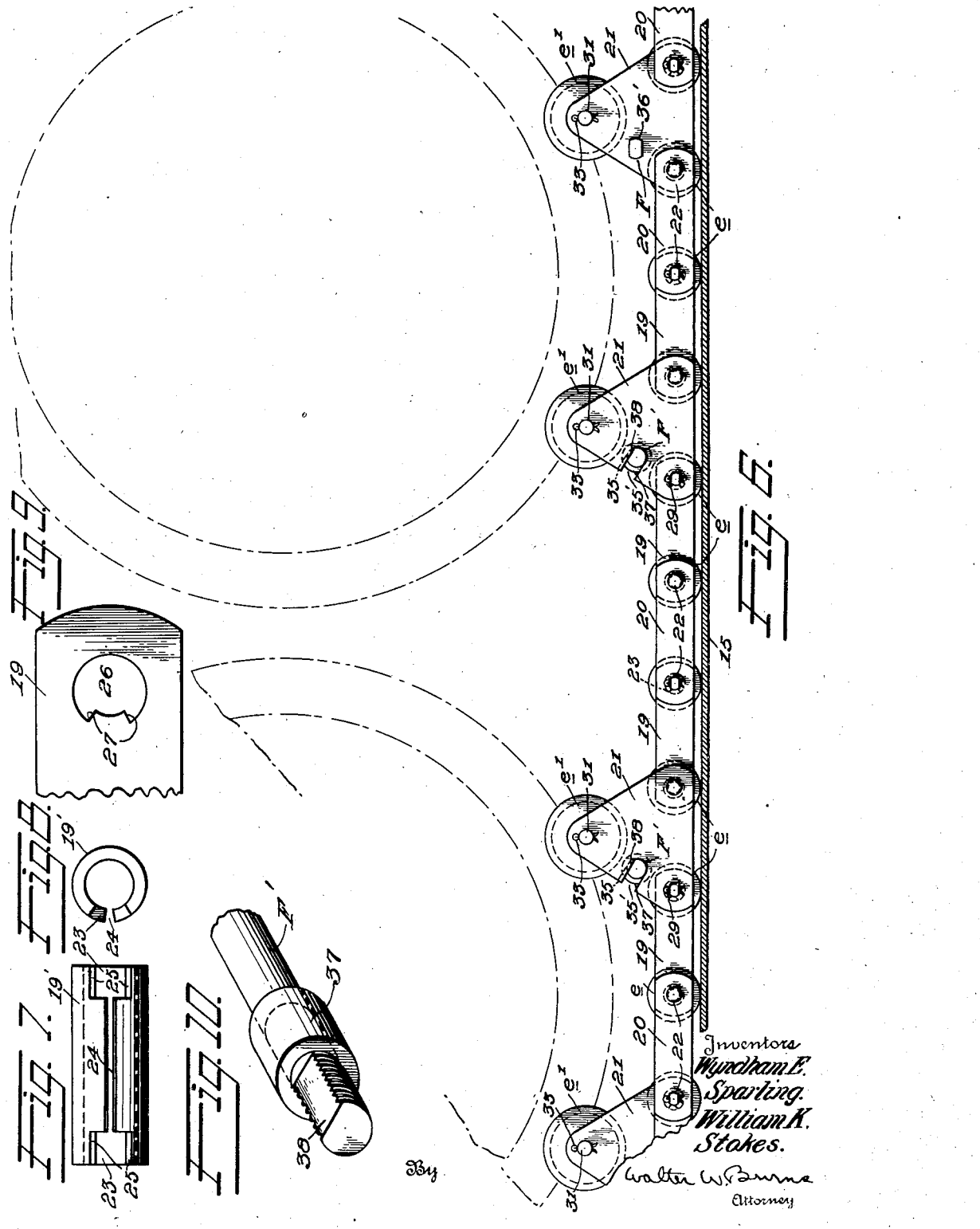

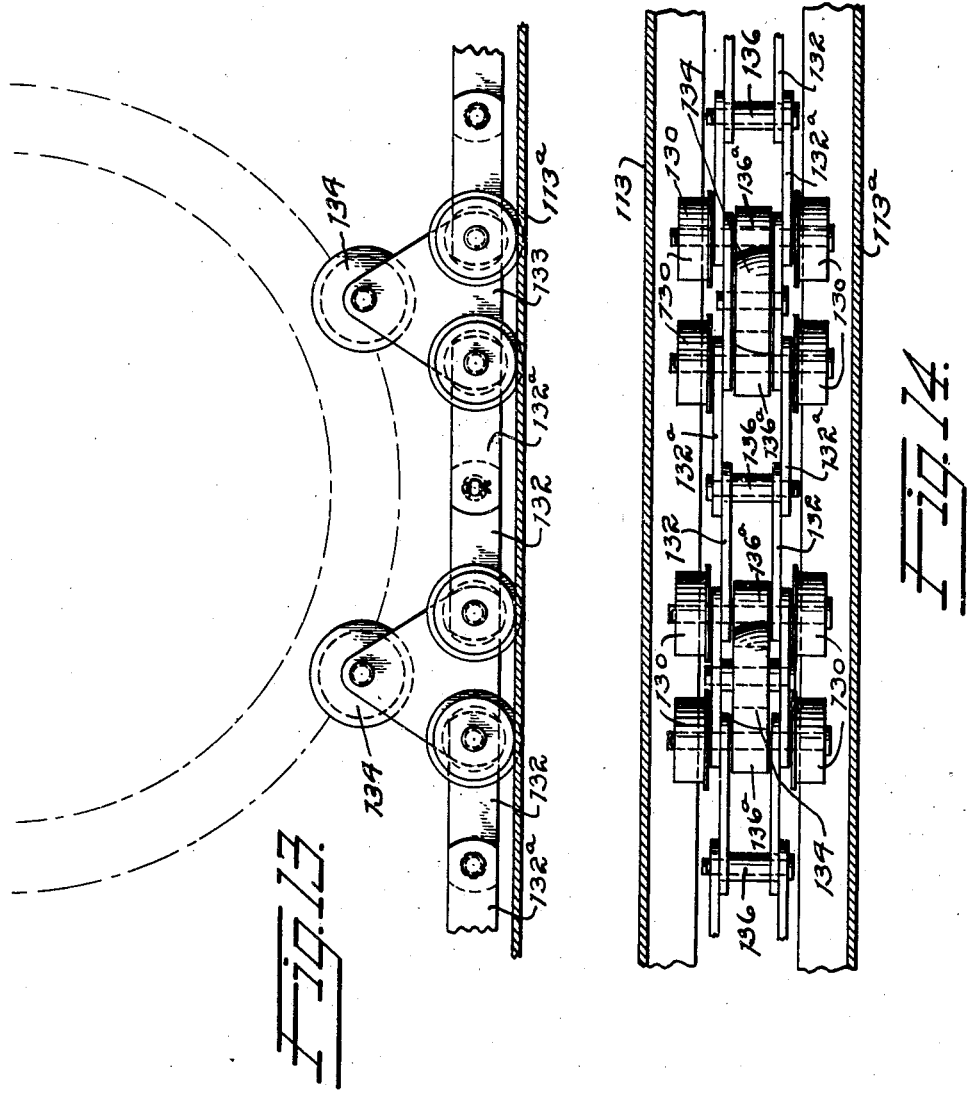

UNITED STATES PATENT OFFICE 2,155,173

SYSTEM OF AND APPARATUS FOR HANDLING BARRELS AND DISCHARGING THE CONTENTS THEREOF

Wyndham E. Sparling and William K. Stokes, Cincinnati, Ohio, assignors to The Alvey-Ferguson Company, Oakley, Cincinnati, Ohio, a corporation of Ohio Application December 20, 1935, Serial No. 55,490

6 Claims. (Cl. 221—69)

One primary purpose of this invention is to provide a barrel conveyor of special construction such as to adapt it for use as a part of a system (a whiskey rectifying system, for example) into which the contents of the barrels are automatically discharged, preferably through the open bung holes of the barrels, continuously and while the barrels are being conveyed; and another primary purpose is to provide a system comprising a barrel conveyor and a trough to receive the contents of the barrels being conveyed and in which system the trough and conveyor are correlated to coact in causing the contents of the barrels to be transferred to the trough with saving of time and labor in comparison with hand dumping operation.

Still another purpose of the invention is to so construct the conveyor that the barrels may be seated thereon and removed therefrom with maximum ease and will be maintained against rotative or rolling movement while they are being transported and their contents are being discharged.

An additional purpose is to provide a system of the nature set forth, which will be of strong, durable and yet simple construction and whose several parts will coact in effecting continuous transfer of the contents of barrels into appropriate containers provided for such transfer in a most efficient manner, that is, in a minimum space of time and with a minimum amount of hand labor.

To these several ends, the invention includes:

(1) A barrel conveyor characterized in that it comprises a series of barrel-engaging elements so arranged thereon as to engage the sides of the barrels near the opposite ends of the latter and to support said barrels out of contact with any element or part which would tend to cause the barrels to rotate or roll automatically while being transported.

(2) A barrel conveyor in which the said barrel-engaging elements are of rotative nature to facilitate the mounting of the barrels upon said conveyor and their removal from the same, and also their being turned by hand to a predetermined position when such turning is necessary or expedient, all with the greatest ease and facility.

(3) A barrel conveyor comprising endless chains which in one form are spaced apart to support opposite ends of barrels and having rotative means on the chains for supporting the barrels for independent rotation during the time they are being transported, the two chains being independently constructed but operative conjointly to carry the barrels, one end of a barrel being carried by one chain and the other end by the other chain.

(4) A barrel conveyor comprising endless chains which in another form are spaced apart to support opposite ends of barrels and having rotative means on the chains for supporting the barrels for independent rotation during the time they are being transported, the two chains being independently supported and being secured together at intervals by rods, one end of one barrel being carried by the rotative members of one chain and the other end by the other chain.

(5) A barrel conveyor comprising endless chains at opposite sides thereof and in which the before mentioned barrel-engaging elements are carried by said chains and are elevated above the latter when in barrel transporting position and are so positioned with respect to each other as to provide a series of successive open seats in which the barrels are held against rolling or rotative movement and with their axes transverse to their direction of travel while their contents are being discharged.

(6) A system comprising a supporting frame structure having a loading station at one end, an unloading station at its other end and a built-in elongated trough extending from one of said stations to the other, together with a barrel conveyor which is so related to said frame and trough as to permit the contents of the barrels to be discharged continuously into the trough while they are being transported along the latter.

(7) A system comprising a supporting frame structure having a loading station at one end, an unloading station at the other and a built-in elongated trough extending from one of said stations to the other, together with a barrel conveyor having two independent chains to support the barrels and travelling on opposite sides of the trough, the chains carrying barrel supporting means permitting the barrels to be turned while in transport, to a position to empty the barrel contents into the trough during travel over the trough.

(8) A system comprising an appropriate frame, a barrel conveyor and an appropriate container into which the contents of the barrels are discharged while the barrels are being conveyed, said frame, conveyor and container being relatively so constructed and arranged that full barrels delivered to a workman at the receiving end of the system may be successively loaded by said workman onto the receiving end of the conveyor and, when their bung holes have been opened by said workman, may readily be turned to position their said open bung holes at the underneath sides of the barrels and will be held in said position without rotative or rolling movement in their travel from the receiving to the discharging end of the container, during which their contents will have been discharged into the container and, when their contents have been so discharged, may readily be removed from the conveyor by a workman at the discharging end of the latter.

(9) A system of the character set forth, in which (a) the trough is a built-in part of the supporting frame, (b) the conveyor comprises endless roller chains at opposite sides thereof, each provided with special links which project therefrom and upon whose outer ends barrel-engaging rollers are journaled, and (c) the supporting frame is provided with rails preferably arranged substantially in the plane of the top of the trough, and upon which the working runs of the roller chains travel and with other rails which are arranged below the plane of the trough and in positions to be respectively engaged by the rollers of the chains and the barrel engaging rollers in the returning run of the chains.

(10) A system including a frame structure having a barrel loading station at one of its ends, a barrel unloading station at its other end and a trough built into said frame structure and extending from the barrel loading station to the barrel unloading station, together with an endless conveyor including a pair of connected, unitarily movable endless traveling roller chains arranged at opposite sides thereof and means carried by said chains and forming a series of successive open seats having rotative barrel-engaging elements, in which the barrels being transported are held in elevated position with respect to the frame and chains and against rotative movement and transverse to their direction of travel and with their bung holes downwardly open to the trough, said frame structure also including rails at its opposite sides extending longitudinally thereof and engaged by the rollers of the working runs of the conveyor chains and other rails respectively engaged by the rollers of the returning run of the chains and the barrel-engaging rollers of said returning run.

Other purposes of the invention will be obvious to those skilled in the art from the following description of preferred embodiments thereof: the said embodiments including preferred constructions of the several parts and novel combinations and correlations of the same substantially as hereinafter set forth and particularly pointed out in appended claims.

In the drawings, illustrating said preferred embodiment:

Fig. 1 is a side elevation of a whiskey rectifying mechanism according to the present invention:

Fig. 2 is a transverse section on the line 2—2 of Fig. 1:

Fig. 3 is a detail view of a particular means for taking up slack in the endless drive chain for the conveyor:

Fig. 4 is a plan view on a larger scale than the preceding figures, showing a part of the conveyor:

Fig. 5 is a cross sectional view on the line 5—5 of Fig. 4:

Fig. 6 is a side view on a larger scale than Figs. 1 and 2 of a part of the conveyor:

Fig. 7 is a side elevational view of one of the bushings forming a part of the conveyor chains:

Fig. 8 is an end view of the bushing.

Fig. 9 is a side elevation of one of the links forming the conveyor chains; and

Fig. 10 is a perspective view of one end of one of the tie rods.

Fig. 11 is a view similar to Fig. 1 but of another form of the invention:

Fig. 12 is a cross sectional view on the line 12—12 of Fig. 11:

Fig. 13 is a detail view of the form of chain used in the form of the invention illustrated in Figs. 11 and 12.

Fig. 14 is a detail plan of a section of the conveyor chain shown in Figs. 11, 12 and 13.

Similar reference characters refer to the same or similar parts throughout the specification and drawings.

Mounted in a suitable supporting frame is an elongated trough B which extends longitudinally of said frame and has its opposite ends respectively spaced from the corresponding ends of the latter to provide a loading station A in advance of said trough and an unloading station $A^1$ rearward of the trough.

While the frame may be of any suitable structure appropriate to a given installation in which the contents of barrels are to be emptied into a trough or other suitable container while the barrels are being transported in a predetermined position relatively to the latter, the structure thereof preferred for use with the particular conveying mechanism hereinafter described comprises a series of uprights 10 arranged at each of the opposite sides of the frame and spaced from each other along the length of the trough, and other uprights $10^a$ and $10^b$ spaced from each other and whereof the upright $10^b$ is spaced from the upright 10 at the loading end of the frame and still other uprights $10^c$ and $10^d$, likewise spaced from each other, and whereof the upright $10^d$ is spaced from the upright 10 at the unloading end of the frame.

The several uprights 10 on one side of the frame are connected with the corresponding uprights on the other side of said frame by transverse members 11 which support longitudinally extending members 12 which engage the lower corners of the trough B throughout the length of the latter. The uprights 10, the transverse members 11 and the longitudinal members 12 are each formed of angle irons appropriately arranged to support the trough B as a substantially built-in part of the frame structure. The uprights $10^a$ and $10^b$ at opposite sides of the frame, together with the uprights 10 next to the respective uprights $10^b$ and together also with appropriate frame elements connecting the uprights $10^a$, $10^b$ and 10 at one side of the frame with the corresponding uprights at the opposite side of the frame constitute the loading station A, and likewise the uprights $10^c$ and $10^d$ at each side of the frame together with the uprights 10 next to the uprights $10^d$ and together also with appropriate members which connect the uprights $10^c$ and $10^d$ with each other and each with the corresponding upright at the opposite side of the frame, constitute the unloading station $A^1$. The uprights $10^a$, $10^b$, 10 and $10^d$ are each of the same height while the uprights $10^c$ are shorter than the others and are connected respectively with the uprights $10^d$ by upper and lower longitudinal members $10^d$ and $10^f$. Transverse members 13 and brackets 14 or other appropriate connecting and/or stiffening members are located wherever necessary in the construction of the loading and unloading stations. These stations are provided with transversely extending shafts C and D each having a sprocket wheel C¹ or D¹ mounted near one end of its ends and in alinement one with the other, as will be seen upon reference to Fig. 1. Similar sprocket wheels are mounted upon said shafts near the opposite ends of the latter. One pair of these sprocket wheels, as (the wheels D¹ for example) are fixed upon the corresponding shaft, (D in this instance) and the latter shaft is provided with means, such as that hereinafter described, for imparting power thereto, while the other pair of sprocket wheels (C¹) are loose upon their shafts.

The transverse members 11 and hence the members 12 supported thereby are spaced from the top and bottom of the uprights 10 and the trough B is located in the upper of these spaces.

15, 15 designate upper rails which substantially form parts of the frame structure and extend longitudinally of the latter and are secured at their opposite ends to the upper ends of the uprights 10ᵇ and 10ᵈ, their intermediate portions being secured by appropriate brackets 14' to the uprights 10. These rails are arranged approximately in the horizontal plane of the top of the trough B. 16—16 designate lower rails which are mounted on transversely extending members 17 arranged at the base of the frame and considerably below the plane of the bottom of the trough B. These rails 16 extend throughout the length of the frame and have their opposite end portions (which respectively form parts of the loading and unloading stations A and A¹) suitably connected to the uprights 10ª at one end of the frame, and to the uprights 10ᶜ at the opposite end of the frame, and their intermediate portions suitably connected to the uprights 10ᵇ, 10 and 10ᵈ. Other rails, 18 and 18', are arranged in said loading and unloading stations and in parallel relation with the corresponding end portions of the rails 16. The said end portions of the rails 16 and rails 18 and 18' are longitudinally curved, the purpose of which will hereinafter appear.

The upper rails 15—15 are respectively traversed by the working runs of endless traveling conveyor chains E—E having supporting rollers e—e which engage said rails and also have elements, as rollers e¹—e¹, relatively arranged to engage the opposite sides of the barrels near the opposite ends of the latter and to support the barrels in position in which they may be free from rotative or rolling movement while being transported.

Each of said endless chains E—E comprises a series of pairs of flat edgewise disposed inner parallel side bars 19—19, a series of pairs of flat edgewise disposed outer parallel side bars 20—20 and a series of pairs of triangular vertically disposed side members 21—21. The pairs of side bars 19 and 20 and the pairs of side members 21 are suitably interspersed and successive pairs are arranged with overlapping end portions and are connected with each other by bushed pivot pins which extend through said overlapping end portions. Thus, it will be noted that in the exemplified form of the invention, certain of the triangular vertically disposed pairs of side members 21—21 are arranged in line with the outer side bars 20—20 and have the inner surfaces of the opposite ends of their respective bases in overlapping relationship with the outer surfaces of the adjacent side bars 19—19 while others of said side members 21—21 are in line with said bars 19—19 and have the outer surfaces of the opposite corners of their respective bases overlapped by the inner surfaces of the side bars 20 on opposite sides thereof.

It will also be noticed that the ends of those side bars 20 which do not overlap the corners of the side members 21—21 are in overlapping relationship with the corresponding ends of the adjacent side bars 19 and that the side bars 19—19 of each pair whose ends are overlapped by the ends of certain of the side bars 20 and also the particular side members 21—21 whose base portions are in alinement with the side bars 19—19 and whose lower corners are overlapped by the ends of others of the side bars 20—20, are connected with each other by transversely arranged bushings 19'—19' which are fixedly secured to the ends of the side bars 19—19 or corners of the base portions of the members 21—21, as the case may be, by appropriate means, one of which will be presently described.

Horizontal pivot pins 22 respectively extend through the several bushings which connect the respective pairs of side bars 19 with each other and other horizontal pivot pins, similarly marked 22, extend through the several bushings which connect the base portions of the respective pairs of side members 21 with each other. These pivot pins extend entirely through and protrude at their opposite ends from their bushings and their said protruding ends extend through the ends of the side bars 20 as well as some of members 21, certain of the former being in overlapping relationship with the side bars 19 and others with the corners of the side members 21, as shown.

The particular pivot pins which connect successive side bars 19 and 20 with each other and also those which connect the side bars 19 with the side members 21 aligned with the side bars 20 have their ends respectively fixed in relation to the ends of said bars 20 and side members 21. Hence, each of said pairs of side bars 20 and each of said pairs of the side members 21, together with the corresponding pivot pins substantially forms an upwardly open chain link of unitary construction whose ends have pivotal movement about horizontal axes relatively to the side bars 19 and side members 21 which are in line with said bars 19, the pivot pins serving as journals and the corresponding bushings serving as bearings for the pivot pins, in this movement. Similarly, each pair of side bars 19, together with the bushings connecting said bars with each other and each pair of side members 21 alined with said side bars 19, forms an upwardly open chain link of unitary construction having pivotal movement about a horizontal axis upon the corresponding pivot pins.

As a means for fixing the bushings in position relatively to the side bars 19 or side members 21 alined with said side bars, each of said bushings has its ends formed with cut out portions 23 which extend inward from the ends a distance equal to the width of bars 19 or members 21 and each bushing also is formed with a longitudinal slit 24 which extends from one cut out portion to the other; and the opposite ends of the side bars 19 and side members 21 alined with said side bars 19 are formed with correspondingly shaped openings 26 having shoulders 27 to be engaged by the spaced eyes 25 of the cut out 23, the said lugs and cut out edges thereby coacting in holding the bushings against rotative movement relatively to the corresponding side bars and side members.

As a means for fixing the pivot pins against rotative movement relative to the side bars 20 and to the side members 21 which are alined with side bars 20, each of said pivot pins has one of its ends formed of angular shape in cross section and each of said side bars and said side members is formed with a corresponding shaped opening to receive said angular end portion of the corresponding pivot pin. Each pivot pin 22 has its body portion circular in cross section to permit the links whose bushings are fixed to the side bars 19 and side members 21 alined with said side bars 19 to have rotative movement upon the corresponding pivot pins, respectively and to permit the pivot pins which are fixed with relation to the side bars 20 and side members 21 in alinement with said bars 20 to rotate within the corresponding bushings. Each pivot pin also has its flattened end formed with an opening to receive a cotter pin 29 and its opposite end formed with a head 30, the said head and cotter pin coacting in holding the pivot pin against longitudinal movement relatively to the corresponding link. In practice, it is preferred to arrange alternate pivot pins with their heads at the same side of the chain.

The bushings are formed of case hardened steel and the pivot pins are preferably formed of appropriate steel which has been heat treated to thereby give maximum durability to these parts which are subject to wear and correspondingly prolong the life of the chains.

The chains supporting rollers e—e, which, in the working runs of the chains engage the rails 15, 15 are rotatably mounted upon the corresponding bushings 19', respectively, and the barrel-engaging rollers $e^1$ are respectively mounted on the protruding ends of stub shafts 31, which stub shafts extend through spacing bushings 32 whose opposite end portions engage members 21, and the shafts 31 are held against axial displacement by cotter pins 33'.

Each of the rollers e and $e^1$ is preferably provided with internal balls or other rotative elements of friction-reducing nature upon which its outer surface rotates relatively to the corresponding pivot pin or corresponding stub shaft, as the case may be.

It will be noticed that the special barrel-supporting links comprising the side members 21 are so spaced along the length of the respective chains that two consecutive rollers $e^1$ connected to one of the chains E will be in position to engage opposite sides of the same barrel near one end of the latter and two consecutive rollers $e^1$ connected to the other chain E likewise will be in position to engage said opposite sides of the same barrel but near the end of the latter opposite that engaged by the first mentioned pair of rollers. It will also be noticed that said rollers $e^1$ in the working runs of the chains E—E are elevated above the horizontal plane of the said chains and hold the barrels out of contact with any frame member or other device which would cause said barrels to rotate or roll automatically while being emptied of their contents.

In short, four pairs of side members 21 are so arranged with respect to each other as to support four barrel-engaging rollers $e^1$ in positions to engage opposite sides of a barrel near opposite ends of the latter, said rollers thereby providing supports upon which the barrel rests at four places while being moved along the length of the trough B and which supports hold the barrel in position elevated above the chains E—E and against automatic rotative movement.

It will be obvious that the system includes several of the four pairs of side members arranged in the described relationship and that the supports for each barrel are so arranged with respect to the supports for the barrel next in line therewith that no barrel will interfere with any other. The external shape of the barrels hence makes it necessary to space the pairs of side members 21 which carry the rollers $e^1$ for engaging corresponding sides of different barrels (the second and third rollers of Fig. 6, for example) a greater distance apart than the rollers which are to engage opposite sides of the same barrel (as the first and second or the third and fourth roller shown in said Fig. 6).

It will be understood that while it is preferred to utilize as the barrel-engaging elements devices of rotative nature, it is not wholly impracticable to use devices of non-rotative nature and it will also be understood that if devices of rotative nature are employed, it is not wholly impracticable to fix them to the ends of shafts which are rotative in appropriate bearings. However, since the rotative movements of the barrel-engaging devices (namely, the rollers $e^1$) is to facilitate the positioning of the barrels in the seats provided by the barrel-engaging devices at the loading station and to facilitate the removal of said barrels from said seats at the unloading station, the end sought is best accomplished by the use of rollers having internal friction-reducing elements and mounted to rotate upon said elements and relatively to a fixed shaft. The rollers $e^1$ are held against lateral movement preferably by cotter pins 33 extending through one end of each shaft and by disc-like members 34 mounted upon the opposite ends of each shaft, the cotter pins and disc-like members engaging the outer surfaces of the two side members 21 of each special link. These disc-like members 34 may desirably be the inner bearing members of ball bearings whose outer bearing members are fixed to the rim portion of the rollers.

The chains E—E are connected with each other for unitary movement by appropriate means, such as the tie rods F—F', shown best in Figs. 4 and 5. Each of these tie rods preferably has each of its opposite end portions extending horizontally outward from the intermediate portion and the latter depressed or otherwise shaped to conform to that of the barrel and also has each of its said opposite end portions extending through openings in the corresponding pair of side members 21 and suitably secured relative to said members. When the conveyor is associated with a tank, trough, or the like having a part or parts which are required to be inserted or removed after the conveyor has been assembled therewith and which insertion or removal would be interfered with by the tie rods, the connection of the tie rods to the members 21 obviously should be of a readily removable nature. The dump trough, B, of a whiskey rectifying system in which said trough is provided with screens which require frequent cleaning and may not readily be inserted or removed without removal of certain of the tie rods of the present conveyor, exemplifies the condition just referred to. To meet this condition, we have found it to be expedient to provide for the ready removal of certain consecutively arranged tie rods, rather than of the entire series of the same, in which case the conveyor chains should be moved into a position in which said consecutively arranged tie rods, after their removal, will leave the way clear for the removal or insertion of the screens. In one important installation having a trough B of considerable length, we have found it to be sufficient to provide for the removal of three consecutive tie rods, although the number thereof may be varied in accordance with the needs of a given installation.

Two consecutively arranged removable tie rods, those designated F', are illustrated along with a tie rod F which is not intended to be readily removable. The ends of the tie rods F' extend through open-ended slots 35 and 35' formed in the side members 21 of the corresponding special or attachment links (see Fig. 6) while the tie rods F extend through apertures 36 and 36' formed in the side members 21 of the corresponding attachment links.

Each end of each of the tie rods F' has suitably secured thereto as by welding a spacer 37 (see also Fig. 10) adapted to engage the inner face of the outer one of the side members 21 of the corresponding link as is clearly shown in Fig. 5 and the rod is provided with a reduced end portion outwardly of the spacer 37 by providing a flattened portion 38 and the end portion is threaded as indicated in Fig. 10 to receive a nut 39 for frictional engagement with the outer face of the outer one of the side members 21 of the corresponding link.

The slots 35 are formed in the inner members 21 and are of a width slightly greater than the diameter of rod F' and the slots 35' are of a width equal to a diameter of the reduced end portions normal to the flattened portions 38 as is clearly indicated in Fig. 6. The slots 35 and 35' are normal to the adjacent edges of their respective members 21 and are parallel to each other.

The working runs of the chains E—E respectively travel from the sprockets C¹ at the loading station to and partway around the sprockets D¹ at the unloading station and in their said movement the rollers e engage the tracks 15. The tracks 15 thus support the weight of the load, the said weight being transmitted thereto from the barrel-engaging rollers e¹ through the attachment links and chain supporting rollers e. After passing around the outer sides of the sprockets D¹ at the unloading station, the chains E—E return to their engagement with the sprockets C¹ and in this return movement the chain supporting rollers e engage the tracks 18' and 18 at the unloading and loading stations, respectively, and the barrel-engaging rollers e¹, as shown in Fig. 2, engage the track 16. The end portions of the tracks 18' and 16 at the unloading station are downwardly curved and the end portions of the tracks 18 and 16 at the loading station are upwardly curved, since the major part of the path traversed by the returning runs of the chains is below the horizontal plane of the bottom of the trough B. It will be understood, however, that any suitable correlation of sprockets and tracks with respect to the returning runs of the chains and by which said runs may traverse a path which is below the plane of the bottom of the trough may be resorted to. It will be understood that in practice the speed of movement of the chains E—E is in such relation to the speed of discharge of the liquid contents of each barrel conveyed thereby and to the length of the trough or other container which is to receive said liquid contents that each barrel will be completely emptied when it reaches the unloading station.

In the exemplified embodiments of the invention illustrated in the drawings the power for operating the chains is derived from an electric motor G connected with the shafts D by mechanism of speed-reducing nature. This electric motor G has its power transmitting shaft g provided with a relatively small sprocket wheel g¹ connected by a chain g² with a larger sprocket wheel g³ which is mounted on one end of a shaft g⁴ having on its other end a worm g⁵ which meshes with a worm wheel g⁶ which is of larger diameter than any of the preceding wheels and is mounted on a shaft g⁷ having a sprocket wheel g⁸ of small diameter and connected by an endless chain g⁹ with a large sprocket wheel g¹⁰ mounted on the shaft D on which the beforementioned sprocket wheels D¹—D¹ engaged by the chains E—E are fixedly mounted.

The motor G and its apurtenant parts are mounted on an appropriate support which is adjustable longitudinally to take up slack in the chain g¹⁰.

The means for bodily adjusting the motor G to move it toward or from the shaft D and consequently to adjust the degree of slack of chain g⁹ comprises a slidable support G¹ upon which the motor and shaft G are mounted. This support has sliding movement in an elongated frame G² and is guided in said frame by the bearing extensions G⁵ of the support G¹. The frame G² may be supported through the medium of any suitable type of bracket G³, G⁴. For effecting adjustment of the support G¹ in the frame G² the front wall G⁶ of the support G¹ is provided with a nut G⁷, the said nut being affixed to said wall and being engaged by an adjusting screw G⁸. This screw is supported to turn freely in the front wall of the frame G² and may be locked against rotation therein by a binding nut G¹⁰. An angular portion G⁹ upon the screw G⁸ provides means for imparting rotation to the screw through the application of a suitable tool thereto. The construction described is a very common one for adjusting the belt tensions of motors, etc. and any suitable modification thereof may be resorted to.

In order to keep the conveyor chains E—E taut, we provide at the loading end A, sliding supports 42 which are movably mounted in the slides 43 and carry the journals of the shaft C. A screw 44, is provided to adjustably secure the slides 42 in the desired adjusted position. By turning the screws 44 to move the slides 42 and the shaft C, the sprockets C' will tighten or loosen the conveyor chains, depending upon which way the screws 44 are turned.

From the foregoing description, it will be readily understood that the operation is as follows:—

The full barrels are brought by any suitable means to a workman at said loading station A and are consequently pushed by him into the respective seats provided by the barrel-engaging elements e¹ as the latter reach barrel-receiving position at the loading station. While each barrel is passing along the loading station and before it reaches the trough B, its bung is removed and it is turned to a position with its opened bung hole downward. This operation, which is repeated with respect to each barrel delivered to the loading station, is completed when, and only when, the barrel is so positioned that the liquid will flow through the same into the trough B, without waste thereof. When the respective barrels have reached the end of the trough B and have been emptied of their contents, a workman at the unloading station A¹ removes the same from the conveyor. It will be evident that the use of rollers e¹ as the barrel-engaging elements facilitates, as hereinbefore stated, the placing of the barrels in the seats formed by said rollers and also facilitates the turning of the barrels to a position in which the bungs may be most conveniently removed and thence into position in which the liquid will readily flow from the barrels directly into the trough B. The rotative nature of the barrel-engaging elements e¹ likewise facilitates whatever movement of the barrels relatively to said elements is necessary at the unloading station.

While passing along said loading and unloading stations and relatively to the trough between said stations, the chains are supported and guided by the tracks 15 and their movement is facilitated by the rollers e which substantially form parts of the chains. In their return movement from the unloading station to the loading station, said chains, as hereinbefore described, travel throughout such passage with their said rollers e¹ in operative engagement with the tracks 16 and this is an additional reason for utilizing rollers as the barrel-engaging elements. In this, return, movement of the chains they are guided at the end portions of said movement (through the loading and unloading stations) by engagement of their rollers e with the tracks 18' and 18 in said stations whereby the rollers e¹ are held in engagement with the tracks 16 during that portion of their movement which is not truly horizontal.

In Figs. 11 to 13, there is illustrated another form of the invention which in certain ways is advantageous over the form already described.

An elongated trough B extends longitudinally of a suitable supporting frame to points short of the frame ends. The frame is constructed in a manner somewhat similar to the corresponding part in Fig. 1 with the exception that due to the conveyor construction, it is not necessary to have such high uprights as in the construction of Fig. 1. This is due to the fact that no tie rods or other connections between chains are used.

The frame has uprights 110, 110ª at its opposite sides to support the trough and conveyor while end uprights 110ᶜ support the conveyor driving means, to be described.

Transverse member 111 are secured to uprights 110 and support the trough B'. The longitudinal members 112 are also carried by the transverse members 111 trough B' throughout its length. At the ends of the frame and beyond the trough ends are stations A and A¹ for loading and unloading the barrels respectively, as has already been described.

Opposite the respective longitudinal members 112 and supported on the uprights 110ª, are longitudinal members 112ª.

Above the members 112 and 112ª are channel irons 113, 113ª respectively. Connecting angle frame members 114, 114ª are provided and are connected at their outer ends to the upright 110ª and at their inner ends to an angle 115. This latter angle member 115 is secured to the side of the trough B' whereby a rigid structure is obtained.

Extending between the upper ends of the respective uprights 110ᶜ and the upright 110ª are supporting angle bars 116 for bearing the weight of the bearings 117 carried thereon.

In the bearings 117 is located a shaft 118 to which are secured two conveyor sprockets 119 and a driving sprocket 120. The sprocket 120 corresponds to the sprocket g¹⁰ already described and its driving chain is the chain g⁹ already described.

At the loading end of the frame, the uprights 110ª support frames 122 in which are located sliding journal blocks 123 which are provided with suitable means for moving the blocks to tighten the conveyor chains to be described. Journaled in the blocks 123 is a shaft 124 which carries sprocket wheel 125. These sprocket wheels 125 carry the conveyor chains which will now be described.

The conveyor chains are two in number in the modification being described and since the construction of both is identical, it is thought that a description of one is sufficient.

The chain links are very similar in construction to the chain already described. In addition however, this chain has supporting wheels on each side, with the necessary means for holding the parts together.

The chain supporting wheels 130 are provided on each end of axles 131 which act as pivot pins for the links of the chain. Connecting link members 132, 132ª are provided to act as tension members in the chain, while, the upright link members 133 act as barrel supporting members. On these barrel supporting members 133 are mounted barrel rollers 134 having a shape to contact without injury with the surface of the barrel to be carried. These rollers are supported on axles 135 and between the upright supporting link members 133. To separate the supporting link members 133 and the connecting link members 132, there are provided the bushings 136, which are similar to the bushings 19'. Spacer blocks 136ª may be provided to give additional stiffening action.

The wheels 130 are flanged with their flanges on the inside to contact with the edges of the angle bars 112, 112ª and the channels 113, 113ª. The axle pins 131 are provided with heads on one end and cotter pins and coacting holes on the other.

At the top of the upright supporting members 133 are bearings for the pivot pins 137 which support barrel-carrying rollers 134.

The channel irons 113, 113ª extend the full length of the upper reaches of the conveyor chains—from the sprockets 125 to the sprockets 19. It will be noted that the chains with their supporting wheels are locked between the channel bars 113, 113ª during the whole time they are in position to carry the barrels from loading station A to unloading station A¹. During this time, the chains are restrained from any substantial movement except in a longitudinal direction along the channels as tracks. Due to this construction, no direct connection between the two chains is necessary.

When the barrels are loaded at A, they are carried on the rollers 134 which move with complementary rollers 134 of the other chain. As the barrels travel along on the conveyor chains, they may be turned to any position as with an open bung hole at the lowermost position to permit emptying the barrel during travel along over the trough B'. At the same time, both conveyor chains move at the same speed as they are moved by the conveyor sprockets 120 which are fixedly mounted in the shaft 118.

The lower or return reach of the conveyor travels along the angle irons 112.

It will be noted that while the operation of the two structures is substantially the same, the latter structure has no cross tie rods between the chains. For this reason, there is an unobstructed passage of the barrel contents from the barrel to the trough, during the emptying operation.

It is to be understood that the invention is not limited to the precise constructions shown and described, but that it includes within its purview whatever changes fairly come within either the terms or the spirit of the appended claims.

Having thus described the invention, what we believe to be new and desire to secure by Letters Patent, is:

1. In combination, an open trough or the like, an endless traveling barrel conveyor in operative relationship therewith, said barrel conveyor comprising two disconnected chains passing along adjacent the sides of the trough, means for moving the chains along their paths at concurrent speeds and means on one of the chains complementary to similar means on the other chain to support a barrel in transit.

2. In combination, an open trough or the like an endless traveling barrel conveyor in operative relationship therewith, said barrel conveyor comprising two disconnected chains passing along adjacent the sides of the trough, means for moving the chains along their paths at concurrent speeds and means on one of the chains complementary to similar means on the other chain to support a barrel in transit, said complementary barrel supporting means including rollers in position to contact the sides of a barrel adjacent its ends.

3. In combination, a trough, a barrel conveyor comprising a frame, a plurality of endless traveling chains movable longitudinally of said frame and in guided relation therewith and a series of supporting links forming parts of said chain and provided with barrel engaging elements in position to wholly support the ends of the barrels directly upon two of the links in elevated position with respect to and adjacent the chains and out of contact with other portions of the conveyor and frame, the trough having a portion between and below the chains.

4. A trough and barrel conveyor according to claim 3 in which the barrel engaging elements are relatively arranged to form upwardly extending seats upon which the barrels are supported at their ends so that their axes are in positions transverse to other line of travel.

5. A trough and barrel conveyor according to claim 3 in which the barrel engaging elements have pivotal supports on the chain and are spaced to support the barrels on oppositely disposed pairs to support the barrels in position transverse of their line of travel so that they may be rotated on their axes during the bodily travel with the conveyor.

6. In combination, a trough, a barrel conveyor comprising a frame, a plurality of endless traveling chains movable longitudinally of said frame and in guided relation therewith and a series of supporting links forming parts of said chain and provided with barrel engaging elements in position to wholly support the ends of the barrels directly upon two of the links in elevated position with respect to and adjacent the chains and out of contact with other portions of the conveyor and frame, the trough having a portion between and below the chains and rods connecting the chains at intervals and out of position to be contacted by the barrels.

WYNDHAM E. SPARLING.
WILLIAM K. STOKES.